United States Patent [19]

Millett

[11] 4,021,114
[45] May 3, 1977

[54] FILM STRIP CONTROLLER

[75] Inventor: James A. Millett, Fountain Valley, Calif.

[73] Assignee: Lure Camera Ltd., Vancouver, Canada

[22] Filed: Jan. 26, 1976

[21] Appl. No.: 652,079

[52] U.S. Cl. .............................................. 355/41
[51] Int. Cl.² ........................................ G03B 27/52
[58] Field of Search ............................. 355/40–42, 355/55, 63

[56] References Cited

UNITED STATES PATENTS

| | | | |
|---|---|---|---|
| 3,169,441 | 2/1965 | Johnson | 355/63 X |
| 3,537,790 | 11/1970 | Ferguson | 355/41 |
| 3,549,254 | 12/1970 | Muir | 355/55 |
| 3,600,089 | 8/1971 | Walter | 355/42 X |
| 3,752,578 | 8/1973 | Allan | 355/41 X |
| 3,768,905 | 10/1973 | Williams | 355/41 X |

Primary Examiner—Donald A. Griffin
Attorney, Agent, or Firm—Joseph L. Strabala

[57] ABSTRACT

A film strip controller for exposed and developed photographic roll film adopted to be used with a photographic printing apparatus employing a roll film strip transport drive using slip clutches, includes a magnetic brake assembly responsive to signals generated as a result of varying light intensity incident upon a plurality of photosensitive detectors. The brake assembly stops the roll film being transported through the controller with each negative image on the film strip in proper registration and locates the negative in the proper plane so the shutter of the associated photographic printing apparatus can be operated to expose a positive print of the negative. Operation of the shutter may release the brake of the controller allowing the film to continue to move through the film strip controller until stopped by the brake means for the next negative. Logic circuits associated with the brake assembly and the photosensitive detectors insure proper control by rejecting spurious signals caused by irregularities sensed on the film strip.

9 Claims, 10 Drawing Figures

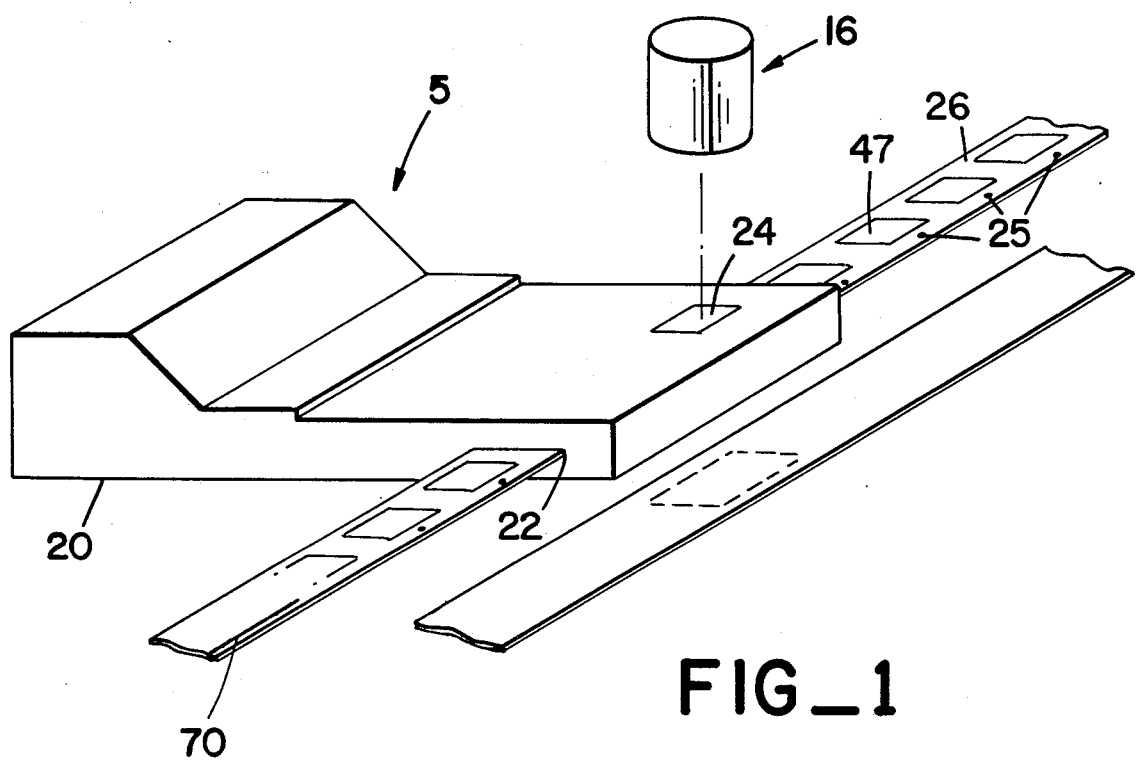
FIG_1
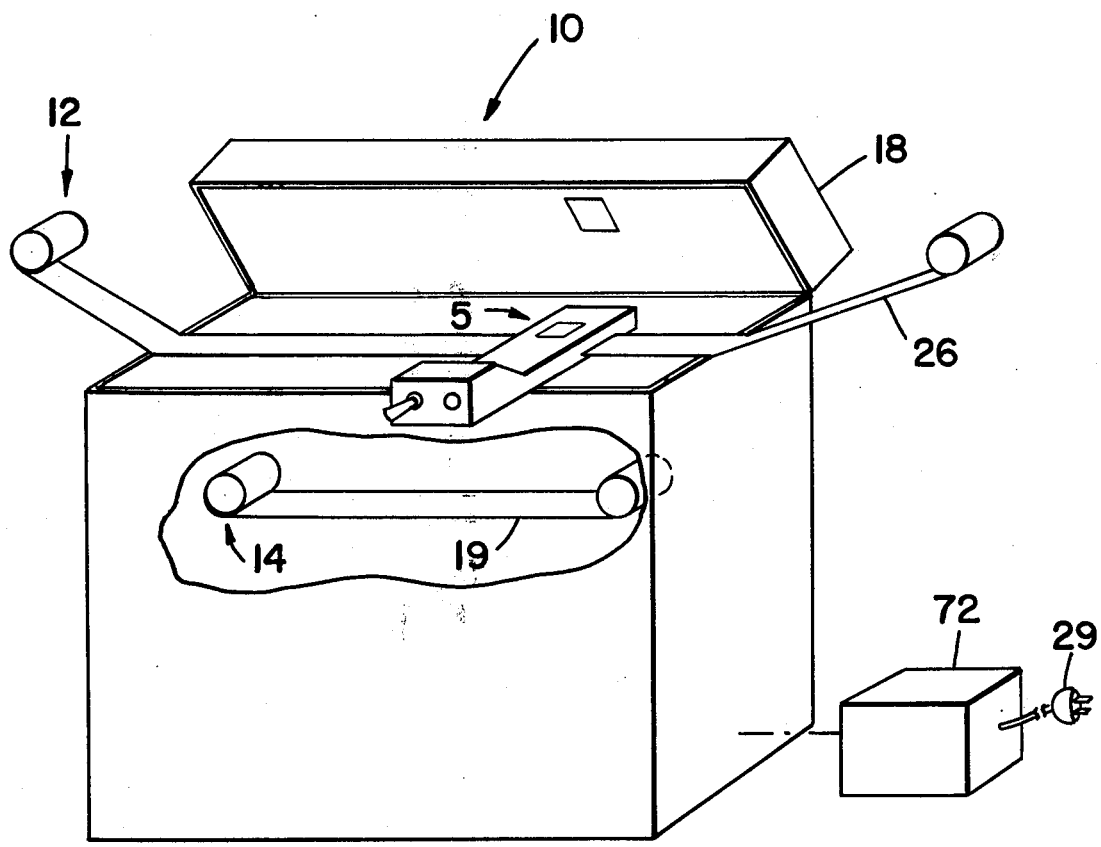
FIG_2

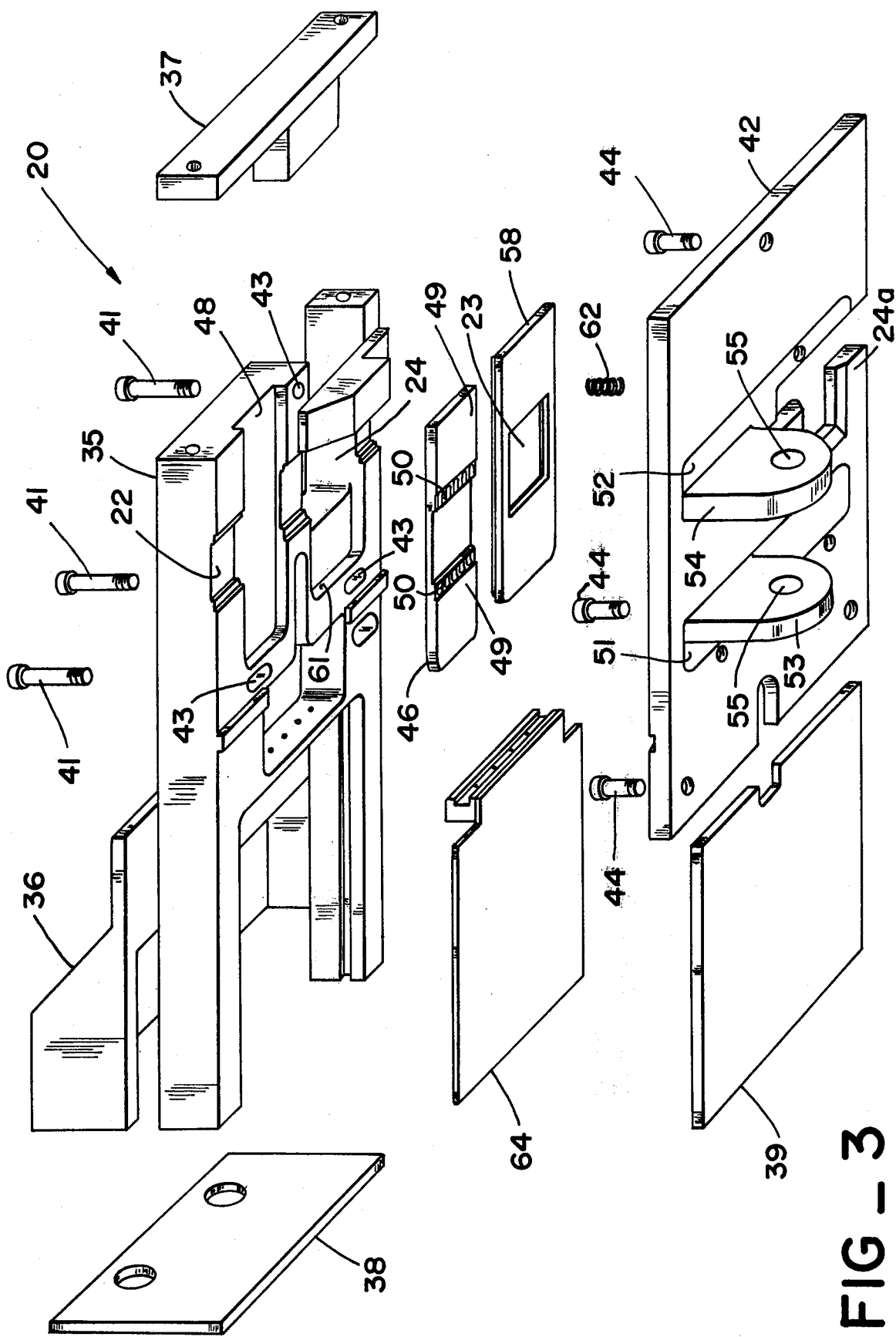
FIG_3

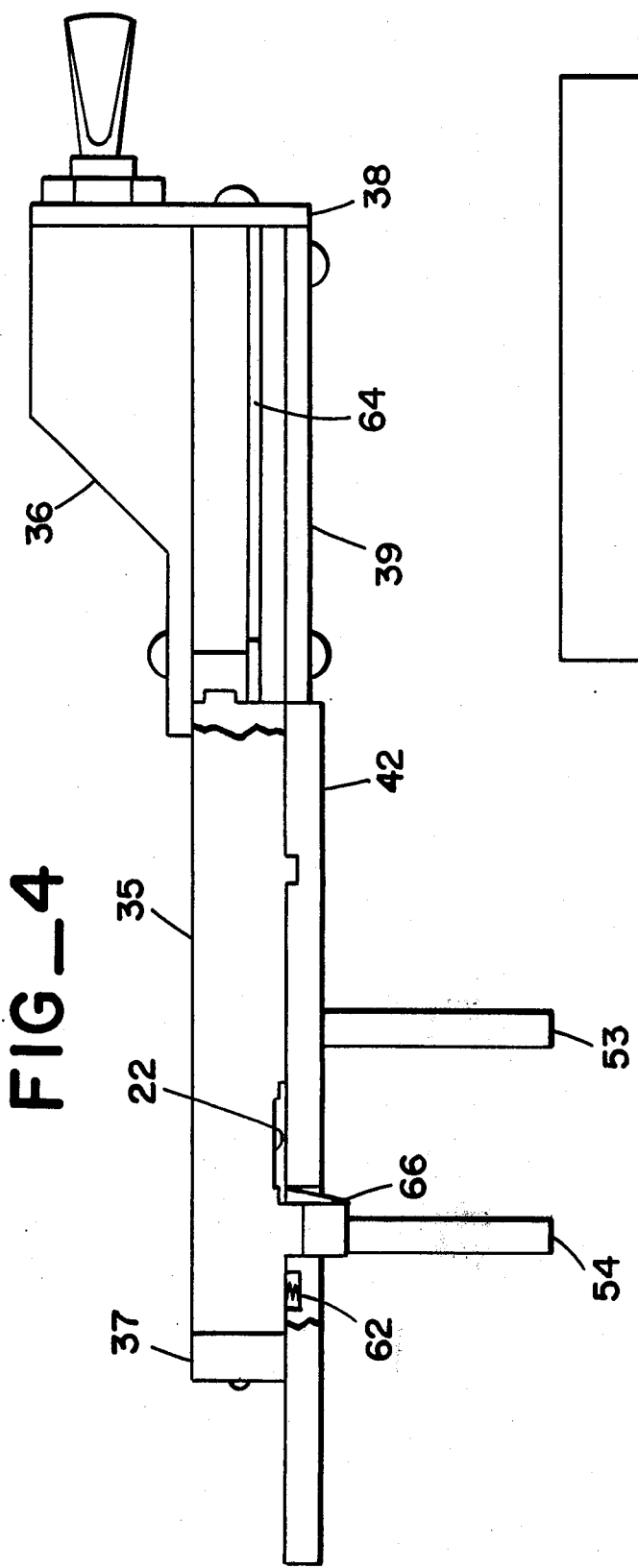
FIG_4
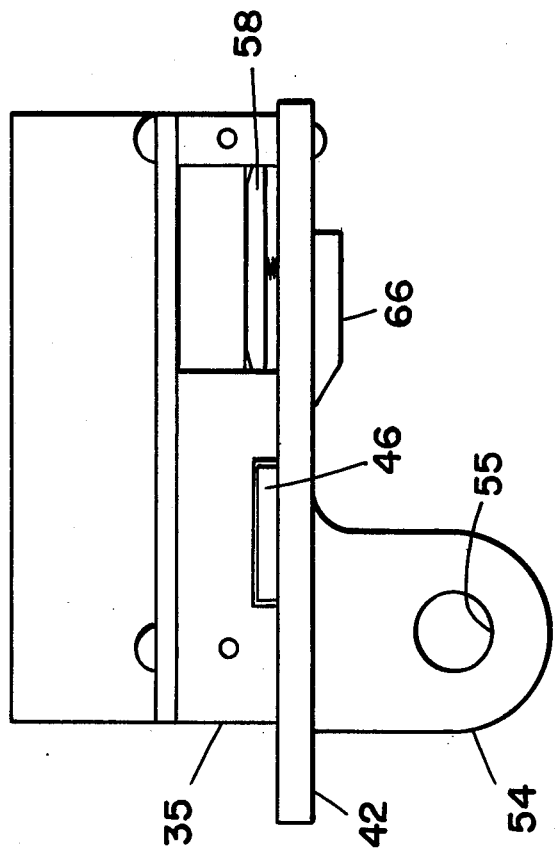
FIG_5

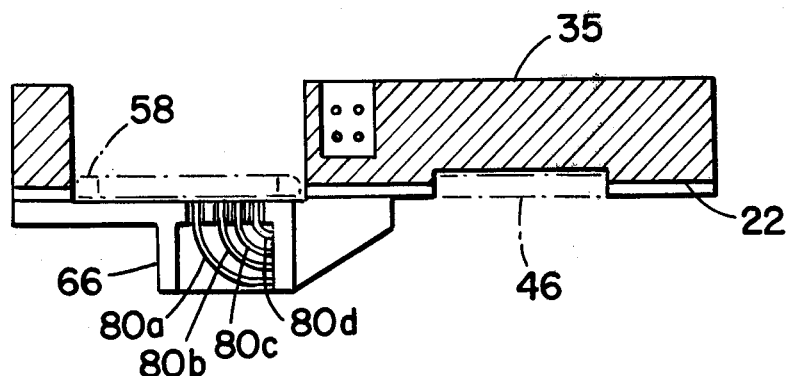
FIG_6
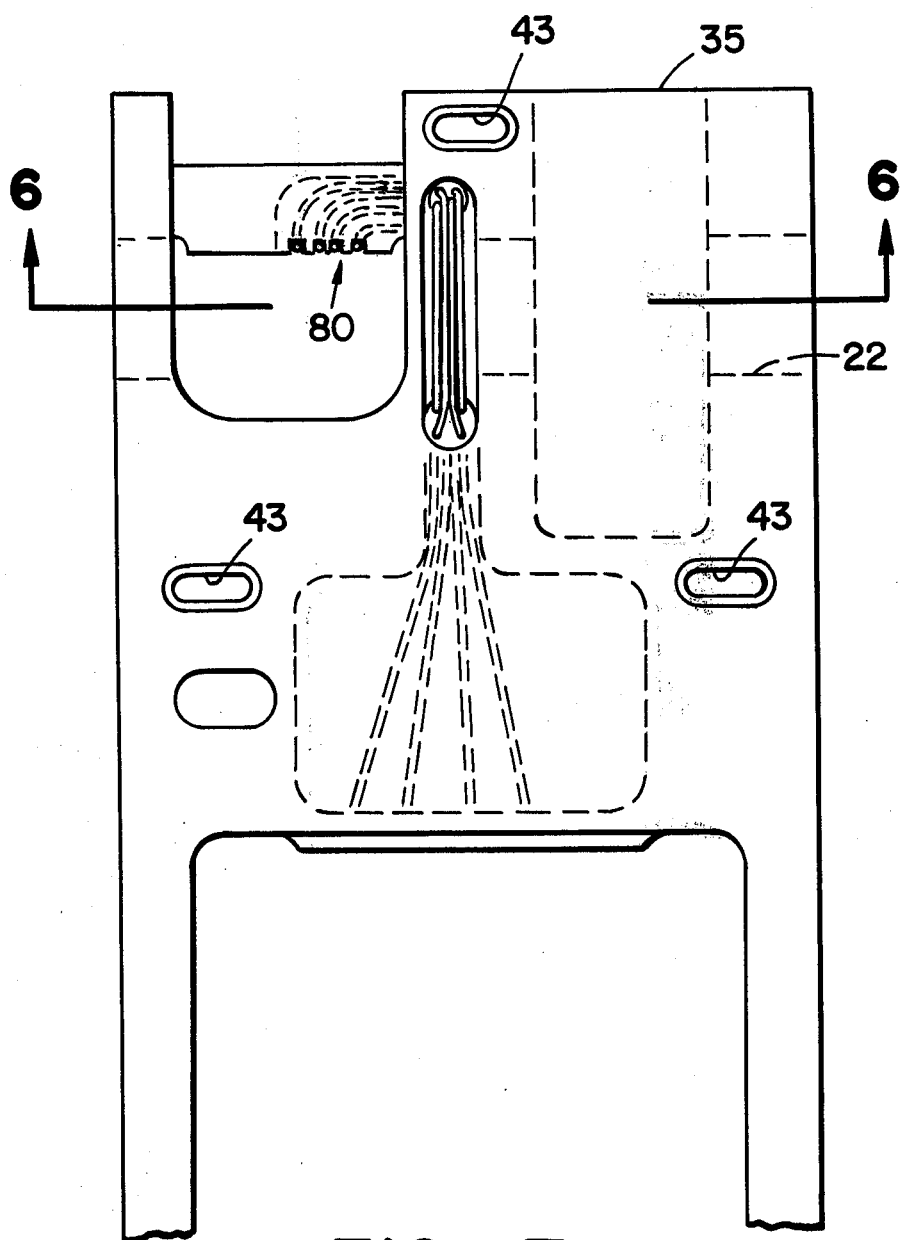
FIG_7

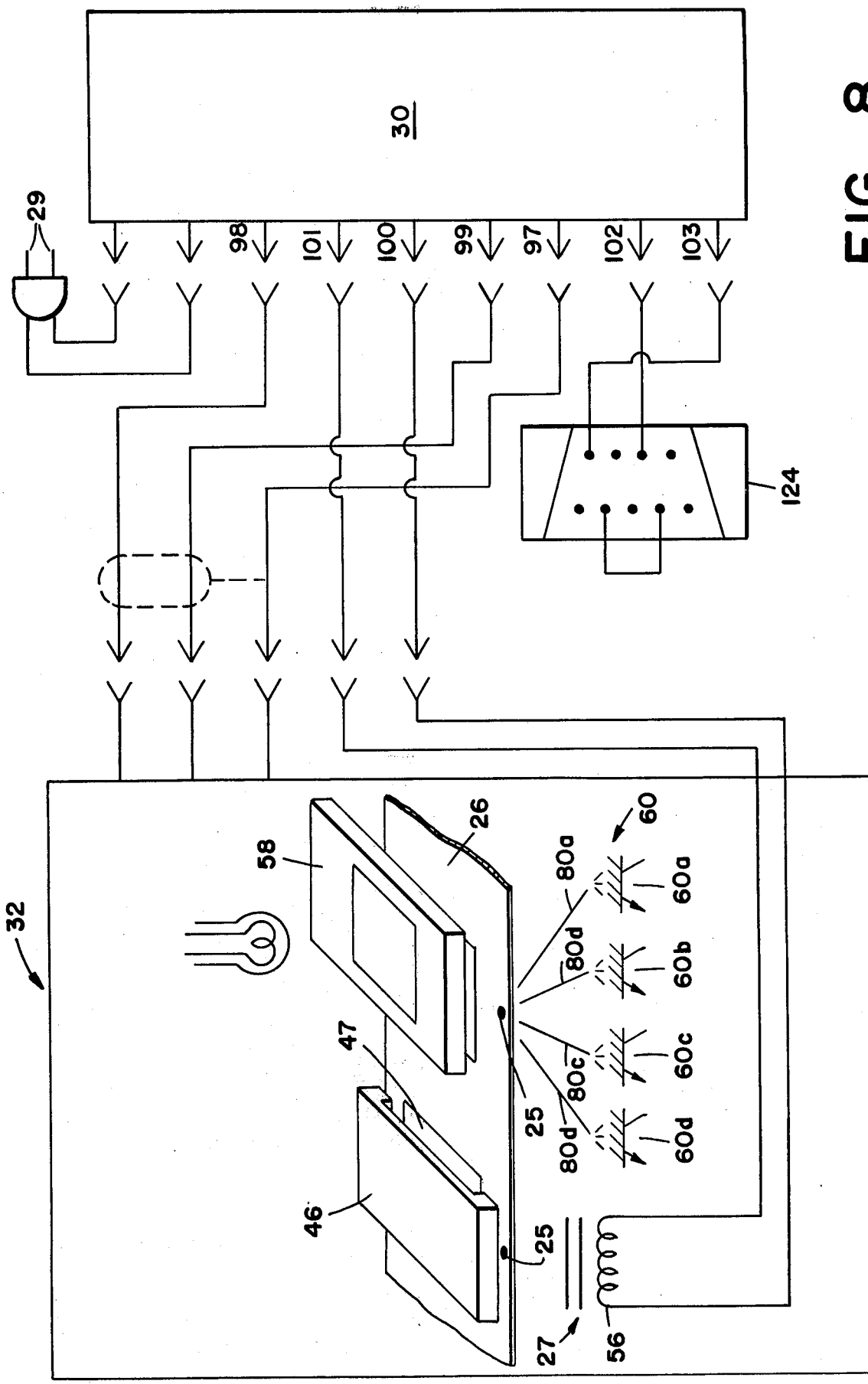
FIG_8

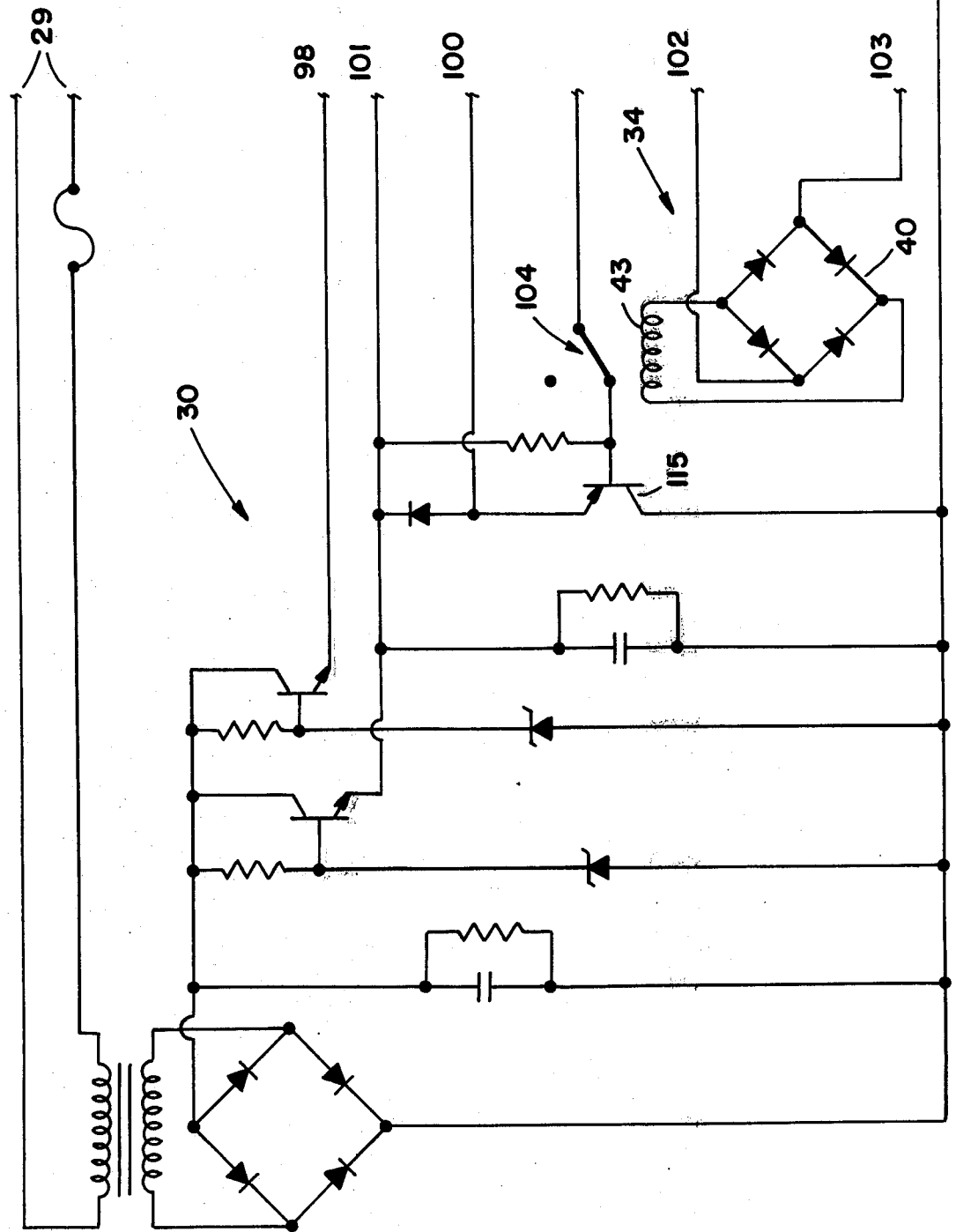
FIG_9

FILM STRIP CONTROLLER

BACKGROUND OF THE INVENTION

The commercial printing of pictures from roll film is normally accomplished by transporting roll film under a light source while simultaneously transporting unexposed photosensitive paper through a photographic printing apparatus. The roll film is indexed through the printing apparatus and is stopped as each negative image registers with a window or aperture through which the light from the light source may be projected. Generally, a shutter and appropriate optics are located between the film and the paper. The shutter may be triggered automatically or manually, depending upon type or mode of operation of the printing apparatus.

In order to stop the film automatically as each exposed negative moves into registration with the exposure window some positive method of indexing must be used. One indexing method counts sprocket holes or perforations along the edge of the film; another utilizes punched holes located on one side of the negative, each hole associated with a negative image. In both the sprocket hole system and the punched hole system, a pin is normally inserted through the appropriate sprocket hole or punched hole in order to stop the film in proper registry.

Non-perforated film requires some other method for achieving registration of exposed negatives with an exposure window. U.S. Pat. No. 3,752,578, issued to Allen on Aug. 14, 1973, discloses a microfilm transport and enlarger, wherein the film transport motor is controlled to position an image relative to the optical axis of the enlarger. The Allen patent, in controlling the drive motor, suffers from two disadvantages; the first being a possible lack of accurate and positive registration between the negative and the optical axis; the second being the time delay inherent in stopping and starting the film drive as the motor is slowed, then stopped prior to exposure and then started after exposure.

Accordingly, this invention is a film strip controller for use on a commercially available photographic printing apparatus which has a conventional roll film transport employing slip clutches on the film transport drive and normally used for perforated film strips. The film strip controller is specifically for controlling non-perforated roll film.

In particular, this invention utilizes a circuit sensitive to light such as the light of the photographic printing apparatus to sense a mark resulting from exposure on an edge on a roll of photographic film in a specially configured camera such as disclosed in U.S. Pat. No. 3,810,218 as well as other marks existent along the same edge of a developed film for control purposes.

SUMMARY OF THE INVENTION

The film strip controller comprises a housing, including attaching means for connecting it to a photographic printing apparatus (such as the Eastman Kodak 2620) between the light source and photosensitive paper contained therein, for properly registering non-perforated developed film strips. This housing has a film guide through which roll film may be transported by the associated photographic printing apparatus, and has an intersecting aperture therethrough perpendicular to the film guide. The intersecting aperture is employed for registering negatives of a film strip in the film guide between the light source and the photosensitive paper. Magnetic brake means are disposed in the housing and are responsive to an electric signal to stop a film strip by clamping the film strip in the film guide and further properly locate the film strip in the proper plane for "printing" the negative thereon. A plurality of photosensitive means are mounted along one edge of the film strip guide in a spaced relationship and arranged to have the light intensity incident thereon varied by marks on the edge of the film strip passing through the film guide. A circuit means connected to the photosensitive means includes a first circuit operable to generate an electric signal to operate the magnetic brake means when a specific pattern of marks is detected, and a second circuit responsive to an input signal to disable the first circuit, whereby the film strip is stopped when a specific pattern of marks is detected and remains stopped until the second circuit receives an input signal indicating the necessary exposure is complete.

It is an object of this invention to provide a film strip controller for unperforated film strips to be utilized in association with a commercially available photographic printing apparatus.

It is a further object of this invention to provide a film strip controller which will "read" the presence of a mark or marks on the edge of a roll of developed photographic film and properly stop the roll of photographic film for printing a negative image located thereon in specific relationship to the mark.

It is still another object of this invention to provide a film strip controller which, while accomplishing the above objects, utilizes magnetic brake means responsive to an electric signal to stop the roll of photographic film with the negative image properly located for an exposure to be made.

It is still a further object of this invention to provide a film strip controller which fulfills the above objects and in which the magnetic brake means utilized therein includes a U-shaped brake plate to clamp the edge of an unperforated film strip while a print is being made of the negative image on the film strip.

It is also an object of this invention to provide a film strip controller which, while accomplishing the above objects, includes in addition to the brake means, a window plate responsive to the same electric signal acting on the brake means to place the film strip in proper registration after the brake plate has stopped the film strip.

It is still a further object of this invention to provide a film strip controller which after stopping a roll of exposed negative film by clamping, will release the roll of exposed negative film to permit the film to be transported through the film strip controller to the next proper mark on the film.

It is another object of this invention to provide a film strip controller which while fulfilling the above objects will "read" other marks for controlling the transport of a roll of photographic film.

These objects and other objects will become apparent from a study of the following specification and the accompanying drawings.

BRIEF DESCRIPTION OF THE DRAWINGS

FIG. 1 is a perspective of the film strip controller which is the subject of this invention in schematic relationship to a strip of film, photosensitive paper and a light source.

FIG. 2 is a perspective of the film strip controller illustrated in FIG. 1 mounted on an associated photographic printing apparatus to show its environment.

FIG. 3 is an exploded view of the mechanical parts which comprise the housing including the main body thereof of the film strip controller illustrated schematically in FIGS. 1 and 2.

FIG. 4 is a side elevation of the assembled mechanical parts illustrated in the exploded view of FIG. 3.

FIG. 5 is an end elevation of the same mechanical parts shown in FIG. 4 with the end plate removed.

FIG. 6 is an end elevation view of the main body shown in the exploded view shown in FIG. 3.

FIG. 7 is a plan view of the same main body shown in FIG. 6.

FIG. 8 is a block diagram of the circuit utilized in the film strip controller.

FIG. 9 is a circuit diagram of the power source which is a portion of the circuit illustrated in FIG. 7.

DETAILED DESCRIPTION

Figure 10:
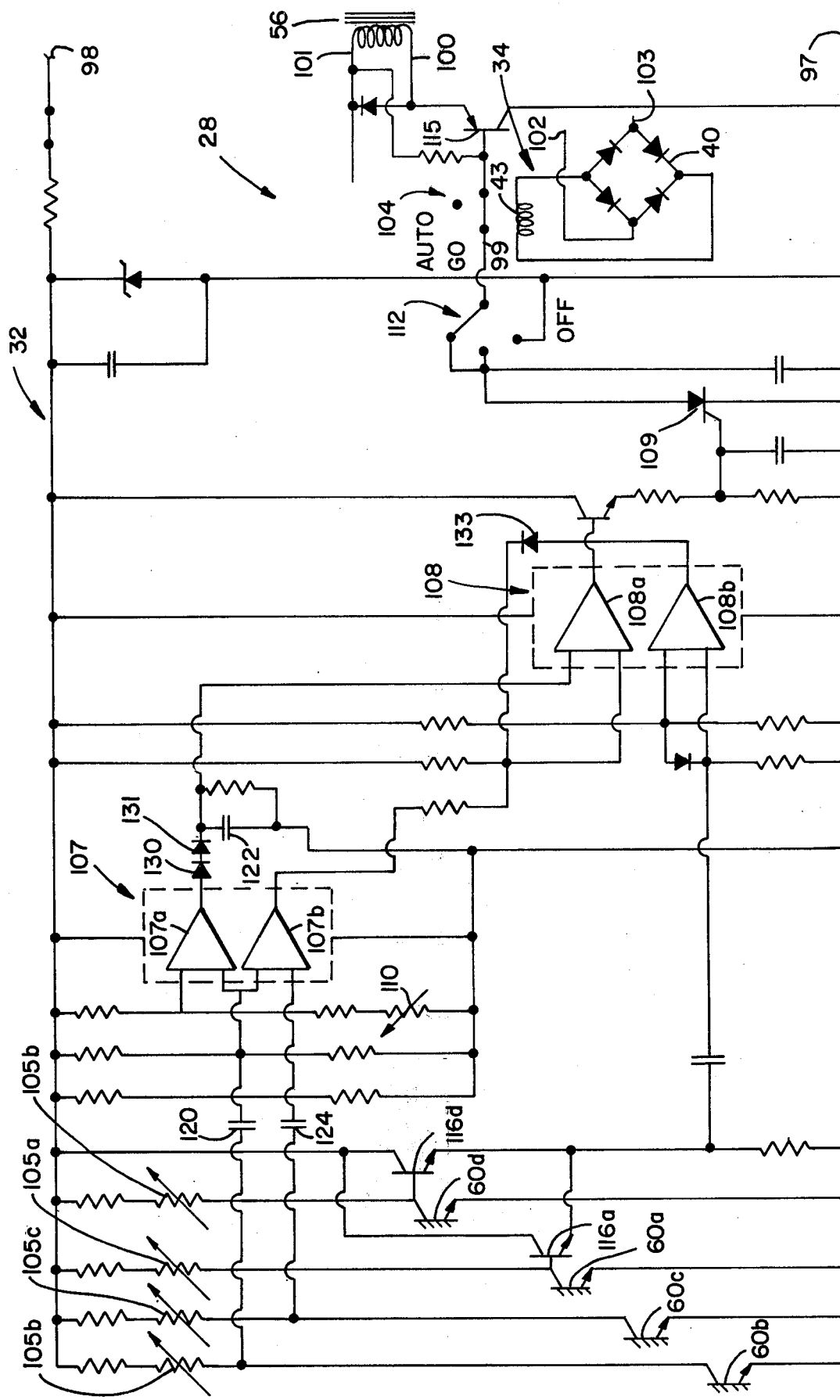
FIG. 10 is a circuit diagram of the first and second circuit which is a portion of the circuit illustrated in FIG. 8.

An automatic photographic printing apparatus of the type contemplated for use with this invention, such as the Eastman Kodak 2620, includes a film transport for rolls of exposed film strips and a photosensitive paper transport for rolls of photosensitive paper. These photographic printing apparatus stop the transported film at each negative image to allow a light source to project light through the negative image and into an optical system to form a latent positive image on photosensitive paper contained in a lightproof portion of the photographic printing apparatus. Processing of the exposed photosensitive paper which is not part of this invention may be either within the photographic printing apparatus or in some other associated equipment.

Referring to FIG. 2, schematic representation of a film strip controller 5 which is the subject of this invention is shown mounted on a representative photographic printing apparatus 10. Photographic printing apparatus 10 includes a roll film transport 12 which may take the form of two rollers, one being motor driven to draw the film through the photographic printing exposure apparatus 10 and must include slip clutches to allow the film strip to be stopped without stopping the drive motor and without damage to the film strip. The photographic printing apparatus 10 has a paper transport 14 which is utilized for feeding unexposed photosensitive paper 19 from a roll through the apparatus. Paper transport 14 would, of course, be contained in the light tight portion of the photographic printing apparatus. Also included in the photographic printing apparatus is a light source 16 which may be mounted in top 18, shown pivotally hinged away from film strip controller in FIG. 2. The photographic printing apparatus should include appropriate circuitry to control the transport of the photosensitive paper so that the paper is stopped at the appropriate time coincident with the stopping of the film to allow projection of an image thereon for exposure.

Having established the basic environment in which the film strip controller, which is a subject of this invention, may be utilized, reference is made to FIG. 1 showing housing 20 which has a film strip guide 22 therein through which a film strip may be transported and an aperture 24 therethrough perpendicularly oriented to film guide 22 for registering negatives of a film strip 26 passing through the film strip guide. A magnetic brake means 27, shown schematically in FIG. 8, is included in housing 20 and is responsive to an electric signal to operably clamp film strip 26 in film strip guide 22 thereby stopping the film strip. A plurality of photosensitive control means 80 (see FIG. 8) are mounted in aperture 24 along one edge of film strip guide 22 and arranged to have the light intensity incident thereon varied by marks 25 on the edge of film strip 26 passing through the film strip guide. Circuit means 28 are responsive to photosensitive control means 80, and include a first circuit 32 (see FIG. 10) operable to generate the electric signal to operate the magnetic brake means when a specific pattern of marks 25 is detected by photosensitive control means 80. Circuit means 28 is further comprised of a second circuit 34 which is responsive to an input signal to disable first circuit 32, thereby releasing magnetic brake means 27 and allowing film strip 26 to move through film strip guide 22 until the next mark 25 is sensed thereon by photosensitive control means 80.

The mechanical construction of housing 20 is illustrated in FIG. 3. The housing is comprised of a main body 35, top 36, first end piece 37, second end piece 38, base plate 42 and base 39. Due to the requirements of the magnetic brake means, the main body, the top, the two end pieces and the base are formed of non-ferromagnetic material. Affixed to the main body by appropriate fastening means 41 and adjacent to film strip guide 22 is base plate 42. Fastening means 41 extend through elongated openings 43 in the main body to allow movement of the main body relative the base plate for alignment of aperture 24 in housing 20 with corresponding aperture 24a in the base plate. Attaching means 44 which may be in the form of set screws, are provided for connecting the housing to the associated photographic printing apparatus 10. These attaching means allow adjusting the plane of the film strip in relation to the associated photographic printing apparatus by allowing vertical movement of the housing toward and away from the optics system.

Magnetic brake means 27 is comprised of a generally U-shaped ferromagnetic brake plate 46, ferromagnetic pole pieces 51 and 52 integrally attached to base plate 42, and a coil wound electromagnet 56 or similar brake circuit means associated with pole pieces 51 and 52. U-shaped brake plate 46 is disposed in a groove 48 of main body 35 oriented transversely to film strip guide 22. The U-shaped brake plate is adapted to be received in groove 48 with its distal ends 49 along the parallel sides of the film strip guide so these ends can clamp the opposite edges of the film strip as the plate moves into the guide without contacting the portion of the film with the negative formed thereon. Distal ends 49 have serrated surfaces 50, to provide better clamping when the U-shaped brake plate is pulled downwardly against a film strip passing through the film strip guide.

Magnetic brake means 27 are operable to clamp a film strip 26, passing through film strip guide 22, in a fixed relation to housing 20 while a print is made of the negative image on the film. To provide the environment necessary to operate magnetic brake means 27, base plate 42 has integrally attached therein the two pole pieces 51 and 52 running generally parallel to film strip guide 22 adjacent aperture 24a and formed of ferromagnetic material, while the rest of base plate 42 ia made of non-ferromagnetic material such as brass or aluminum. Pole piece 51 and pole piece 52 having extending downwardly therefrom projections 53 and 54 respectively, in the vicinity of brake plate 46. These projections each have a bore 55 in which the ends of the magnetic core (not shown) of electro-magnet 56 (shown schematically in FIG. 8) may be disposed. Energization of electromagnet 56 on a signal from first circuit 32 will create a magnetic field attracting the U-shaped brake plate 46, toward pole pieces 51 and 52. Thus a film strip 26 passing through the film strip guide between the U-shaped brake plate and the base plate is clamped therebetween and stopped.

The printing of photographic pictures requires that the film and the optics systems be held in a specific spatial relationship one with the other in order to maintain focus of the image projected on the photosensitive paper. Without this fixed spatial relationship between the film and the optics system, the resulting print on the photosensitive paper may fail to produce a sharp distinct image. Film strip controller 5 achieves this fixed spatial relation in window plate 58 (see FIG. 3) made of ferromagnetic material and thus influenced by the electromagnetic field created by electromagnet 56 to register a negative properly. Window plate 58 is disposed in main body 35 in groove 61 running generally parallel to groove 48. Window plate 58 is pierced by an aperture 23 which registers with aperture 24 passing through housing 20 when the window plate is disposed in groove 61. Aperture 23 has dimensions slightly larger than the dimensions of a negative image 47 located on a film strip 26. A helical spring 62 or similar resilient means is disposed between the window plate and base plate 42 to urge the window plate upwardly away from the base plate and thereby allow a film strip 26 to pass therebelow without interference. Energization of electromagnet 56 will cause the magnetic field to build and first cause brake plate 46 to move downwardly thus stopping motion of film strip 26. As the electromagnet field continues to build it will subsequently cause the window plate to be pulled downwardly toward pole pieces 51 and 52. The window plate is delayed in its downward movement because of its positioning remote of electromagnet 56 relative the brake plate and also due to the resistance of helical spring 62. Thus the window plate, which serves to register film strip 26 in the aforementioned predetermined spatial relationship with the optics system, does not contact the film strip until after the brake plate has stopped the film strip thereby eliminating the possibility of a scratch on a negative image cause by the window plate contacting a moving film strip.

Referring to FIG. 4, where housing 20 is shown in elevation, it can be seen that its top 36, its first end piece 37, its second end piece 38 and its base 39 are affixed to its main body 35 by conventional fastening means. In FIG. 4, the main body is shown partly in section to illustrate the positioning of a circuit board 64 which acts as a base for the electronic circuit described in greater detail hereinafter. FIG. 5 is an end view of the housing with its first end piece removed to show the relative positioning of brake plate 46 and window plate 58.

Housing 20 has disposed therein the plurality of light responsive control means 80 along one edge of film strip guide 22 and arranged so that light incident thereon is varied by a mark or marks on the edge of a film strip 26 passing through the film guide. Referring to FIG. 6 and FIG. 7, the plurality of light responsive control means 80 comprise four light guides 80a, 80b, 80c, 80d, disposed in part in a depressed socket 66 of main body 35 proximate film strip guide 22. Depressed socket 66 serves to protect the four light guides, herein fiber optic bundles, which transmit light incident thereon respectively to photodiodes 60a, 60b, 60c, and 60d shown schematically in FIG. 10. The fiber optic bundles have lapped and polished ends disposed in the depressed socket so that a film strip will pass transversely above these ends. The ends are retained in the socket by conventional means such as a potting compound. The fiber optic bundles are led downwardly in depressed socket 66 then upwardly and over film strip guide 22 through appropriate passage means in main body 35 to terminate at circuit board 64 wherein light transmitted therethrough is received by the photodiodes (see FIG. 8).

As can be seen in FIG. 8 the four photodiodes 60a, 60b, 60c, and 60d, which are a part of first circuit 32, are respectively associated with the four light guides 80a, 80b, 80c, and 80d. It should be noted that the ends of the light guides are sequentially arranged along film strip guide 22 so that the film transport will move a mark on the film sequentially across the ends of the light guides from 80a to 80d. The circuit is designed to differentiate between specific marks, such as mark 25, indicating the presence of a negative image and spurious marks. Although scratches and blemishes can affect the operation of the device, the sensitivity of the circuit can be adjusted to avoid most such occurrences while the circuit itself may overlook other spurious marks. The circuit when triggered by a mark on the film serves to connect magnetic brake means 27 with a power source in the following manner. A mark, such as mark 25 on the transported film, indicating the presence of a negative will first vary the light incident on photodiode 60a, which consequently ceases to conduct and thus will momentarily positively bias the base of transistor 116a (see FIG. 10) so that a signal is momentarily provided amplifier 108b which by itself has no effect. However, interruption of light to photodiode 60a in combination with an interruption of light incident on photodiode 60b or 60c, inactivates the circuit, as will become apparent. As the mark is transported beyond photodiode 60a, the base of transistor 116a is again negatively biased to cut off the aforesaid signal to amplifier 108b. It will become apparent that as long as photodiodes 60a and the corresponding photodiode 60d, which is fourth and last in the sequence, are exposed to light so that the bases of transistors 116a and 116d remain negatively biased, electromagnet 56 of brake means 27 will be responsive only to proper marks on the film being transported through film strip guide 22.

As the transported mark varies the light incident on photodiode 60b the resulting change in voltage at capacitor 120 is amplified by operational amplifier 107a to positively charge capacitor 122. As the transported mark progresses in film strip guide 22 to subsequently decrease light incident on photodiode 60c, a second signal, resulting from the change in voltage affecting capacitor 124, is amplified in operational amplifier 107b. It should be noted that operational amplifier 107b receives its input from the variations in voltage resulting from changes in light incident on photodiodes 60b and 60c, specifically to provide the necessary polarity, an increase of light incident on photodiode 60b and a decrease of light incident on photodiode 60c.

This amplified signal from operational amplifier 107b is provided to operational amplifier 108a, along with the signal from operational amplifier 107a, to produce an amplified output signal from operational amplifier 108a. This amplified signal switches on semiconductor controlled rectifier 109. This semiconductor controlled rectifier serves to connect electromagnet 56 of magnetic brake means 27 with a direct current source by biasing the base of transistor 115 through a normally closed switch 104. As a result, power is provided to electromagnet 56 through leads 100 and 101. Energization of the electromagnet stops the film as described above to allow an exposure to be made. Power to leads 100 and 101 is provided by power supply circuit 30 as shown in FIG. 9.

Release of the film occurs when a signal is received through leads 102 and 103 of second circuit 34. This signal, which may be externally generated or may be the result of a timing circuit (not shown) or may be a result of the exposure process, passes through a conventional rectifier circuit 40 to energize a coil 43 to momentarily open switch 104. Opening switch 104 de-energizes electromagnet 56 by turning off semi-conductor controlled rectifier 109 to allow film strip 26 to start moving. As soon as the film starts moving, light is again incident on all four photodiodes. As the mark passes photodiode 60d a momentary signal similar to that resulting from the mark passing photodiode 60a is amplified by operational amplifier 108b. This signal by itself has no effect on electromagnet 56.

The purpose of photodiodes 60a and 60d is to detect the presence of an elongated mark or strip 70 indicating a splice or a film leader. Photodiode 60a and 60d provide a signal to operational amplifier 108b when either one or both of them are not conducting as the result of an interruption of the light incident thereupon in the manner described above. The output of operational amplifier 108b is passed through a diode 133 to nullify any signal from operational amplifier 107b. An elongated mark decreasing the light incident on photodiode 60a will have the same effect on photodiodes 60b and 60c as mark 25 as described above; however, because of the nullification signal from operational amplifier 107b, the semiconductor controlled rectifier 109 is not switched on and electromagnet 56 is never energized. As the elongated mark varies light incident on photodiode 60d, the nullification signal is still available because of the reaction by photodiode 60d. Although specifically for the purpose of sensing a splice or a film leader, photodiodes 60a and 60d serve also to screen out some spurious marks which take on an elongated form.

It can be seen that by balancing the circuit and by adjustment of the sensitivity, most spurious signals can be overlooked. Accordingly, the photodiodes 60a through 60d are provided with variable resistors 105a through 105d respectively which allow adjustment and balancing of the voltage drops thereacross. A separate variable resistor 110 is included on the input side of operational amplifier circuit 107 to provide a sensitivity adjustment for the entire circuit.

The circuit just described is particularly designed for sensing marks along one edge of a filmstrip indicating the presence of a negative and resulting from exposure in a specially configured camera such as that described in U.S. Pat. No. 3,752,578. Because of the positioning of light guides 80a and 80d the film 26 may also be marked with an elongated mark or strip 70 along one edge. Thus marks 25, which are the result of exposure in the specially configured camera and are in a particular location relative each negative image 47, are utilized to generate the electric signal necessary to energize electromagnetic brake means to stop film strip 26 as it passes through housing 20 and allow a print to be made thereof. Strip 70, which may be placed on film 26 subsequent to development, will prevent generation of the aforesaid electric signal and therefore allow portions of a film strip to pass continuously through film strip guide 22 without stopping as long as the film has been so marked. Without this latter capability, unwanted delay and unnecessary exposures could occur as a result of a splice between two portions of film strip 26 acting as a spurious mark or further, because of an opaque film leader or trailer acting as a mark.

Power is supplied to the circuit means 32 from a conventional power supply circuit 30 shown in FIG. 9 which is a separate unit. Its transformer is powered with alternating current through leads 29, and its output is connected to the various circuits with the appropriate leads 97, 98, 100 and 101. Leads 102 and 103 which are also shown in FIG. 8 lead from photographic printing apparatus 10 through a cannon plug 124 to operate second circuit 34.

Operation of the film strip controller should be apparent from the previous description of the mechanical parts and electronic circuitry associated therewith; however, for clarity's sake a brief description of operation will follow. Referring to FIG. 2 the film strip controller 5 is adapted for mounting on a photographic printing apparatus 10 by appropriate attaching means (see FIG. 3). Attaching means 44 may be utilized for focusing the negative image on paper 19 (see FIG. 2) while fastening means 41 (see FIG. 3) may be utilized to frame the negative image 47 of an associated film strip on photosensitive paper 19. As shown schematically in FIG. 2, the photographic printing apparatus utilizes rollers on which a film strip 26 may be mounted. Film strip 26 is drawn through film strip controller 5 by appropriate transport means of the photographic printing apparatus which must include slip clutches on the motor so that if film strip 26 is stopped, no damage will occur to film strip 26. Once film strip 26 is properly threaded through film strip guide 22 and with switch 112 (see FIG. 10) in the grounded or "off" position, light source 16 is turned on, simultaneously switch 112 is moved to the "Auto" position as shown in FIG. 10. At this time, light is conducted to and is incident on all four photodiodes 60a through 60d; thus no signal is generated by amplifier circuit 107 to cause energization of magnetic brake means 27, therefore film strip 26 will be drawn through film strip guide 22 until the first mark 25 is sensed by photodiode 60b followed by a sensing by photodiode 60c at which time amplifier circuit 107 will generate the aforementioned output signal turning on semiconductor controlled rectifier 109 to energize the magnetic brake means, stop the film strip and bring it into proper registration with the optics system by urging window plate 58 downwardly on the film strip. A print may then be made in the photographic printing apparatus, either manually or automatically. After the printing is complete a pulse is supplied by the photographic printing apparatus to second circuit 34 at leads 102 and 103 to open normally closed relay switch 104 thus releasing the magnetic brake means and allowing the film strip to move until the next mark is sensed. In the event a strip 70 is sensed, the film strip will continue to move through film strip guide 22.

Although automatic printing of the latent image formed on photosensitive paper 22 has not been specifically described in respect to this film strip controller 5, such automatic printing of pictures on photosensitive paper 19 could be easily accomplished by minor modification of the circuitry.

What is claimed is:

1. A film strip controller for use with a commercially available photographic printing apparatus to make the photographic printing apparatus compatable with non-perforated film strips, the film strip controller comprising:
    a housing with attaching means for connecting said housing to a commercially available photographic printing apparatus;
    said housing having a film strip guide therein and an aperture therethrough for registering negatives of a film strip in said film strip guide;
    magnetic brake means operable to clamp said film strip in said film guide;
    brake circuit means connected to said magnetic brake means and responsive to an electrical signal to operate said brake means;
    photosensitive control means mounted in said aperture along one edge of said film strip guide having at least two spatially separated photosensitive detectors arranged to have the light intensity incident thereon controlled by marks on the edge of a film strip passing through said film strip guide; and
    circuit means responsive to said photosensitive detectors having a first circuit operable to generate an electric signal to operate said brake circuit means when a specific pattern of marks is detected, and a second circuit responsive to an input signal to disable said first circuit; whereby said film strip is stopped by said magnetic brake means until said second circuit receives an input signal indicating the necessary printing exposure is complete.

2. The device set forth in claim 1, wherein the magnetic brake means comprises a generally U-shaped brake plate of ferromagnetic material disposed in said housing and movable generally perpendicular to the film guide strip and further wherein the brake circuit means comprises an electromagnetic device disposed adjacent said housing, said electromagnetic device energized in response to the electric signal of the first circuit to attract said U-shaped brake plate toward said electromagnetic device whereby said U-shaped brake plate clamps the film strip between said U-shaped brake plate and said housing.

3. The device set forth in claim 2, wherein the generally U-shaped brake plate is disposed in the housing with its distal ends generally parallel to the film guide strip, said distal ends separated by a dimension relatively wider than a negative image on a film strip passing through said film guide and narrower than the film strip passing through said film guide.

4. The device set forth in claim 3, wherein the generally U-shaped brake plate further defines serrations on the distal ends thereof.

5. The device set forth in claim 4 further comprising a movable window plate disposed in the housing so that said film strip guide is between said window plate and the electromagnetic device disposed adjacent to said housing, said window plate of generally rectangular shape and defining therethrough an opening of dimensions relatively larger than an exposed negative image on a film strip, said opening in said window plate generally aligned with the aperture passing through the housing for registering negatives of a film strip, said window plate movable in response to operation of the electromagnetic device to register a film strip between said window plate and said housing in a predetermined spatial relation with the photographic printing apparatus.

6. The device set forth in claim 5 further comprising resilient means to urge the window plate away from the electromagnetic device whereby a film strip may freely pass between said window plate and said housing.

7. The device set forth in claim 6 wherein the housing comprises a main body and a base plate affixed thereto, said main body formed of non-ferromagnetic material, said base plate having integrally affixed and imbedded therein two generally rectangular pieces of metallic material having ferromagnetic properties, the remainder of said base plate being of non-ferromagnetic material, said base plate affixed to said main body to form a base thereof; said main body defining a longitudinal groove in the side adjacent the base plate to form with said base plate the film strip guide;
    said main body further defining a pair of rectangular cavities in the side adjacent said base plate and having longitudinal axes generally perpendicular to said film strip guide, said pair of rectangular cavities for receiving the window plate and the rectangular brake plate respectively;
    said two pieces of ferromagnetic material imbedded in said base plate, having two protrusions of ferromagnetic material extending generally downwardly therefrom, forming a mounting means for the electromagnetic device.

8. The device set forth in claim 7 wherein the attaching means comprises adjustment means for moving the film strip guide relatively closer to or relatively farther away from a light source of the associated photographic printing apparatus.

9. The device set forth in claim 8 further comprising registration means for allowing the main frame to move relative to the base plate in a direction parallel to the film strip guide axis.

* * * * *